United States Patent
Sharma et al.

(10) Patent No.: US 12,495,453 B2
(45) Date of Patent: Dec. 9, 2025

(54) SYSTEMS AND METHODS FOR EFFICIENTLY ESTABLISHING PEER-TO-PEER CONNECTIONS

(71) Applicant: Toyota Motor Engineering & Manufacturing North America, Inc., Plano, TX (US)

(72) Inventors: Manali Sharma, Brooklyn, NY (US); Takamasa Higuchi, Mountain View, CA (US); Seyhan Ucar, Mountain View, CA (US); Onur Altintas, Mountain View, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 585 days.

(21) Appl. No.: 17/969,045

(22) Filed: Oct. 19, 2022

(65) Prior Publication Data
US 2024/0137996 A1 Apr. 25, 2024
US 2024/0237091 A9 Jul. 11, 2024

(51) Int. Cl.
*H04W 4/00* (2018.01)
*H04W 8/00* (2009.01)
*H04W 76/14* (2018.01)

(52) U.S. Cl.
CPC ......... *H04W 76/14* (2018.02); *H04W 8/005* (2013.01)

(58) Field of Classification Search
CPC ........ H04W 76/14; H04W 8/00; H04W 8/005
USPC ....................................................... 370/329
See application file for complete search history.

(56) References Cited

U.S. PATENT DOCUMENTS

| | | | |
|---|---|---|---|
| 8,983,493 B2 * | 3/2015 | Brachet ................. | H04W 4/024 370/328 |
| 9,654,552 B2 | 5/2017 | Rayanki et al. | |
| 9,826,368 B2 | 11/2017 | Milne et al. | |
| 10,079,891 B2 | 9/2018 | Monserrat Del Rio et al. | |
| 11,617,162 B2 * | 3/2023 | Kwak ................... | H04W 72/02 370/329 |
| 12,302,413 B2 * | 5/2025 | Hwang ................. | H04W 76/10 |
| 2013/0235758 A1 | 9/2013 | Delmas et al. | |
| 2016/0050118 A1 | 2/2016 | Blanco et al. | |

(Continued)

OTHER PUBLICATIONS

Jeong et al., "A Hybrid V2X System for Safety-Critical Applications in VANET", 2016, pp. 13-18 (6 pages).

(Continued)

*Primary Examiner* — Marceau Milord
(74) *Attorney, Agent, or Firm* — Christopher G. Darrow; Darrow Mustafa PC

(57) ABSTRACT

System, methods, and other embodiments described herein relate to improving latency when establishing peer-to-peer connections between devices. In one embodiment, a method includes, responsive to determining that a connection is to be established with at least one remote vehicle by a subject vehicle, acquiring parameters, from a remote server, that define characteristics of the connection. The method includes performing device discovery and service discovery simultaneously by embedding information about available services within a communication for device discovery. The method includes establishing the connection between the subject vehicle and the at least one remote vehicle according to the parameters.

20 Claims, 8 Drawing Sheets

(56) References Cited

U.S. PATENT DOCUMENTS

| | | | |
|---|---|---|---|
| 2016/0127460 A1* | 5/2016 | Ding | H04W 4/06 |
| | | | 370/312 |
| 2017/0156149 A1* | 6/2017 | Lin | H04K 3/226 |
| 2018/0234942 A1* | 8/2018 | Kim | H04L 61/5014 |
| 2018/0317268 A1* | 11/2018 | Kim | H04W 8/24 |
| 2019/0021069 A1* | 1/2019 | Chun | H04W 76/10 |
| 2019/0239147 A1* | 8/2019 | Chun | H04W 88/06 |
| 2020/0100255 A1* | 3/2020 | Wu | H04L 1/1692 |
| 2020/0178343 A1* | 6/2020 | Kim | H04W 76/27 |
| 2021/0100027 A1* | 4/2021 | Xue | H04W 56/001 |
| 2021/0314749 A1* | 10/2021 | Kwak | H04W 4/40 |
| 2021/0321320 A1* | 10/2021 | Chun | H04W 8/24 |
| 2022/0032977 A1* | 2/2022 | Gupta | B60K 35/00 |
| 2022/0046468 A1* | 2/2022 | Altintas | H04L 67/108 |
| 2022/0109996 A1* | 4/2022 | Lee | H04W 76/14 |
| 2022/0110002 A1 | 4/2022 | Shetty et al. | |
| 2022/0363254 A1* | 11/2022 | Baek | B60K 35/80 |
| 2023/0023478 A1* | 1/2023 | Hwang | H04W 76/50 |
| 2023/0043235 A1* | 2/2023 | Kumari | H04B 7/0617 |
| 2023/0087564 A1* | 3/2023 | Peizner | H04W 4/46 |
| | | | 701/2 |
| 2023/0117475 A1* | 4/2023 | Wang | H04W 76/28 |
| | | | 370/311 |

OTHER PUBLICATIONS

Chandra et al., "Beacon-Stuffing: Wi-Fi Without Associations", 2007, pp. 53-57, (5 pages).

Wi-Fi Alliance, "Wi-Fi Peer-to-Peer (P2P) Technical Specification Version 1.7", 2016, pp. 1-201 (201 pages).

Wi-Fi Alliance, "Wi-Fi Aware Specification Version 3.2", 2020, pp. 1-214 (214 pages).

* cited by examiner

SYSTEMS AND METHODS FOR EFFICIENTLY ESTABLISHING PEER-TO-PEER CONNECTIONS

TECHNICAL FIELD

The subject matter described herein relates, in general, to improving latency when establishing connections and, more particularly, to simplifying interactions between devices when establishing a connection and thereby hastening the establishment of the connection.

BACKGROUND

WiFi Alliance standardized WiFi peer-to-peer (P2P) and WiFi Aware are protocols that enable establishing connections for wireless communication between mobile devices. The protocols generally include extensive connection establishing procedures to initiate connections before the transfer of data can occur. However, when the mobile devices are moving at a high speed, such as with vehicles, and the data that is to be transferred is large (e.g., a software update, a high-definition (HD) map update, etc.), delays in establishing the connection from complex procedures can frustrate the data transfer. This difficulty becomes more significant as connected technologies become more ubiquitous within mobile devices necessitating efficient communication of more information.

SUMMARY

In various embodiments, example systems and methods relate to a manner of improving latency when establishing P2P connections in a mobile environment. As previously noted, transferring large quantities of data between mobile devices, such as vehicles, can present difficulties. In particular, the time that the vehicles are within range to complete a transfer may be relatively short. Thus, the speed at which the devices can establish the connection and transfer the data is key in successfully transferring the data. In some cases, the time may be just long enough to accomplish a transfer; however, because of delays from complex connection establishment protocols, a transfer may fail. In general, the connection establishment protocols define how the devices negotiate and establish the parameters of a connection. The parameters can include various aspects of how the devices communicate, such as roles that define which device controls the relationship and characteristics of the communication channel itself (i.e., a channel frequency, transmission windows, transmission durations, and so on). In some approaches, the various parameters may be dynamically negotiated separately such that multiple interactions occur sequentially, thereby negatively impacting the latency associated with establishing the connection.

Therefore, in one or more embodiments, an inventive system is disclosed that improves the time associated with establishing a connection by streamlining the negotiation of parameters through the use of an intermediary. For example, in at least one arrangement, a connection system may include multiple components, with one instance being implemented within a remote server and client instances being implemented within mobile devices that are to establish connections. It should be appreciated that while a remote server is described, the term remote server is used to embody many different devices that may also perform the noted functions, such as a roadside unit (RSU), an edge server, and so on. The remote server, in one approach, communicates with the mobile devices via a cellular network to obtain information about the mobile devices and to provide information (e.g., parameters) for establishing connections. Accordingly, as one example, upon determining that a connection is to be initiated, the remote server communicates parameters for the connection to the mobile devices. The parameters include, in at least one approach, roles of the mobile devices, assignment of a group owner, identification of a communication channel for discovery, beacon intervals, time periods between consecutive discovery windows, time duration of discovery windows, and so on.

As such, a mobile device that is assigned the role of an advertiser can then initiate a connection with another mobile device based on the parameters from the remote server. In particular, the advertiser can initiate a connection via a beacon message and also embed service discovery information into the beacon message via beacon stuffing. That is, the advertiser uses, in one aspect, extra bits within the beacon message to advertise the availability of a particular service, such as a map update. This approach reduces the number of communication messages between the devices, which would otherwise include multiple rounds of messaging. In this way, the system improves latency by reducing communications via pre-establishing the parameters and beacon stuffing to better facilitate data transfers between mobile devices.

In one embodiment, a connection system for improving connection latency is disclosed. The connection system includes one or more processors and a memory communicably coupled to the one or more processors. The memory stores a control module including instructions that, when executed by the one or more processors, cause the one or more processors to, responsive to determining that a connection is to be established with at least one remote vehicle by a subject vehicle, acquire parameters, from a remote server, that define characteristics of the connection. The control module including instructions to perform device discovery and service discovery simultaneously by embedding information about available services within a communication for device discovery. The control module including instructions to establish the connection between the subject vehicle and the at least one remote vehicle according to the parameters.

In one embodiment, a non-transitory computer-readable medium including instructions that, when executed by one or more processors, cause the one or more processors to perform one or more functions is disclosed. The instructions include instructions to, responsive to determining that a connection is to be established with at least one remote vehicle by a subject vehicle, acquire parameters, from a remote server, that define characteristics of the connection. The instructions include instructions to perform device discovery and service discovery simultaneously by embedding information about available services within a communication for device discovery. The instructions include instructions to establish the connection between the subject vehicle and the at least one remote vehicle according to the parameters.

In one embodiment, a method is disclosed. In one embodiment, the method includes, responsive to determining that a connection is to be established with at least one remote vehicle by a subject vehicle, acquiring parameters, from a remote server, that define characteristics of the connection. The method includes performing device discovery and service discovery simultaneously by embedding information about available services within a communication for device discovery. The method includes establishing the connection between the subject vehicle and the at least one remote vehicle according to the parameters.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Figure 1:
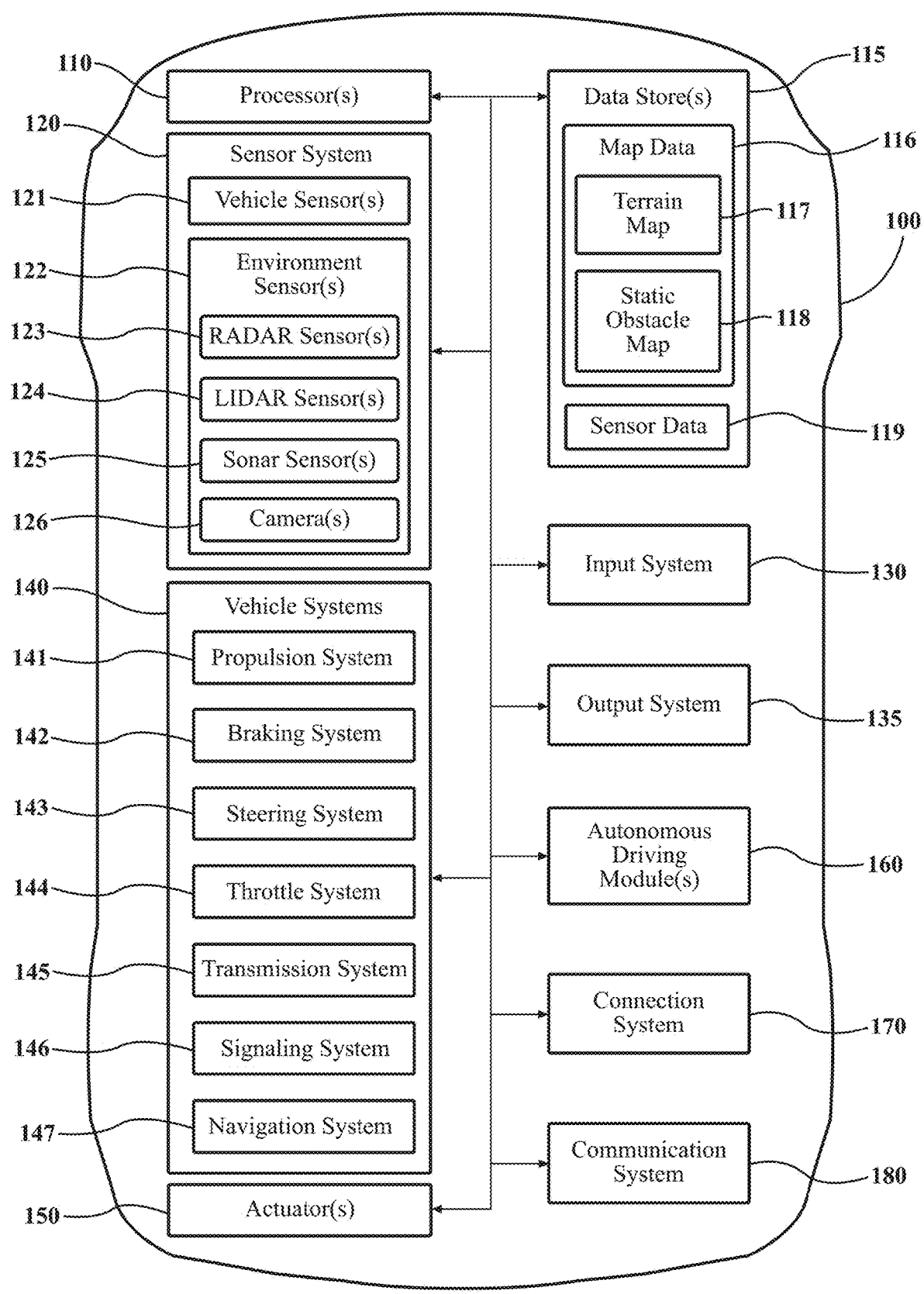
FIG. 1 illustrates one embodiment of a vehicle within which systems and methods disclosed herein may be implemented.

Systems, methods, and other embodiments associated with a manner of improving latency when establishing P2P connections in a mobile environment are disclosed. As previously noted, with more vehicles implementing technologies that rely on software and data, such as high-definition (HD) maps, transferring data between vehicles using P2P connection is becoming more common. However, transferring large quantities of data between mobile devices, such as vehicles, can present difficulties. In particular, P2P communications are typically limited in range to relatively close distances (e.g., several hundred feet). A time that the vehicles are within range to complete a transfer may be relatively short because the vehicles can be moving at speeds that limit a time within range. Thus, the speed at which the devices can establish a connection and transfer the data is key to successfully transferring the data. In some cases, the time may be just long enough to accomplish a transfer; however, because of delays from complex connection establishment protocols, a transfer may fail due to these delays.

In general, the connection establishment protocols define how the devices negotiate and establish parameters of a connection. Examples of such protocols include WiFi Alliance P2P and WiFi Aware. The parameters include various aspects of how the devices communicate, such as roles that define which device controls the relationship, characteristics of the communication channel itself (i.e., a channel frequency), transmission windows, transmission durations, and so on). In some approaches, the various parameters may be dynamically negotiated separately such that multiple interactions occur sequentially, thereby extending the time/latency for establishing the connection.

Therefore, in one or more embodiments, an inventive system is disclosed that improves the latency associated with establishing a connection by streamlining the negotiation of parameters through the use of an intermediary in the form of a remote server. For example, in at least one arrangement, a connection system for establishing P2P connections may include multiple components with separate instances being implemented within a remote server and within client devices that are, for example, vehicles. The remote server, in one approach, communicates with the mobile devices via a cellular network (e.g., Frequency-Division Multiple Access (FDMA), Code-Division Multiple Access (CDMA), etc.) to obtain information about the mobile devices and to provide information (e.g., parameters) to the mobile devices for facilitating establishment of the P2P connections. Accordingly, as one example, upon determining that a connection is to be initiated according to the detection of a proximity of the mobile device, the presence of an update, etc., the remote server determines parameters and communicates the parameters for the connection to the mobile devices. The parameters include, in at least one approach, roles of the mobile devices, assignment of a group owner, identification of a communication channel for discovery, beacon intervals, time periods between consecutive discovery windows, time duration of discovery windows, and so on. In determining the parameters, the remote server may optimize the parameters according to different factors, such as which device is providing a service, and so on.

As such, a mobile device that is assigned the role of an advertiser can then initiate a connection with another mobile device based on the parameters from the remote server. In particular, the advertiser can initiate a connection via a beacon message that, in addition to providing for device discovery, can also include embedded information for service discovery in the beacon message itself by applying beacon stuffing. That is, the advertiser uses, in one aspect, extra bits within the beacon message to advertise the availability of a particular service, such as a map update, thereby leveraging a single communication for multiple purposes and avoiding additional sets of communications that may contribute to latency. This approach reduces the number of communications between the devices overall. Thus, as the listener device receives the beacon message, the listener device can identify the device and the service and proceed with connection establishment via an authentication exchange when the service is desired (e.g., when an offered software update is desired). In this way, the system improves latency by reducing communications via pre-establishing the parameters and beacon stuffing to better facilitate data transfers between mobile devices.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any device that, for example, transports passengers. In various approaches, the vehicle 100 may be an automated vehicle. As used herein, an automated vehicle refers to a vehicle with at least some automated driving functions, such as safety-based control systems that intervene with lateral and/or longitudinal control of the vehicle 100. Thus, the vehicle 100 may operate autonomously, semi-autonomously, or with the assistance of various advanced driving assistance systems (ADAS).

Further, the vehicle 100 is generally a connected vehicle that is capable of communicating wirelessly with other devices, such as other connected vehicles, infrastructure elements (e.g., roadside units), cloud-computing elements, and so on. Moreover, while the present disclosure is generally described in relation to the vehicle 100, in yet further approaches, the noted systems and methods disclosed herein may be implemented as part of other entities, such as electronic devices that are not associated with a particular form of transport but are instead embedded as part of a mobile electronic device (e.g., smartphone) that can be, for example, carried by an individual and that may function independently or in concert with additional systems of other devices.

In any case, the vehicle 100 also includes various elements. It will be understood that, in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within the vehicle 100, while further components of the system are implemented within a cloud-based environment, as discussed further subsequently.

Some of the possible elements of the vehicle 100 are shown in FIG. 1 and will be described along with subsequent figures. However, a description of many of the elements in FIG. 1 will be provided after the discussion of FIGS. 2-8 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, as illustrated in the embodiment of FIG. 1, the vehicle 100 includes a connection system 170 that is implemented to perform methods and other functions as disclosed herein relating to improving how the vehicle 100 establishes a connection with a mobile device, such as another vehicle.

Moreover, the connection system 170, as provided for within the vehicle 100, functions in cooperation with a communication system 180. In one embodiment, the communication system 180 communicates according to one or more communication standards. For example, the communication system 180 can include multiple different antennas/transceivers and/or other hardware elements for communicating at different frequencies and according to respective protocols. The communication system 180, in one arrangement, communicates via a communication protocol, such as a WiFi, DSRC, V2I, V2V, or another suitable protocol for communicating between the vehicle 100 and other entities in the cloud environment. Moreover, the communication system 180, in one arrangement, further communicates according to a protocol, such as global system for mobile communication (GSM), Enhanced Data Rates for GSM Evolution (EDGE), Long-Term Evolution (LTE), 5G, or another communication technology that provides for the vehicle 100 communicating with various remote devices (e.g., a cloud-based server, an edge server, a roadside unit (RSU)). The various communications and protocols may further include cellular communications, such as code-division multiple access (CDMA), time-division multiple access (TDMA), and so on. In any case, the connection system 170 can leverage various wireless communication technologies to provide communications to other entities, such as a remote server, other vehicles, and so on.

Figure 2:
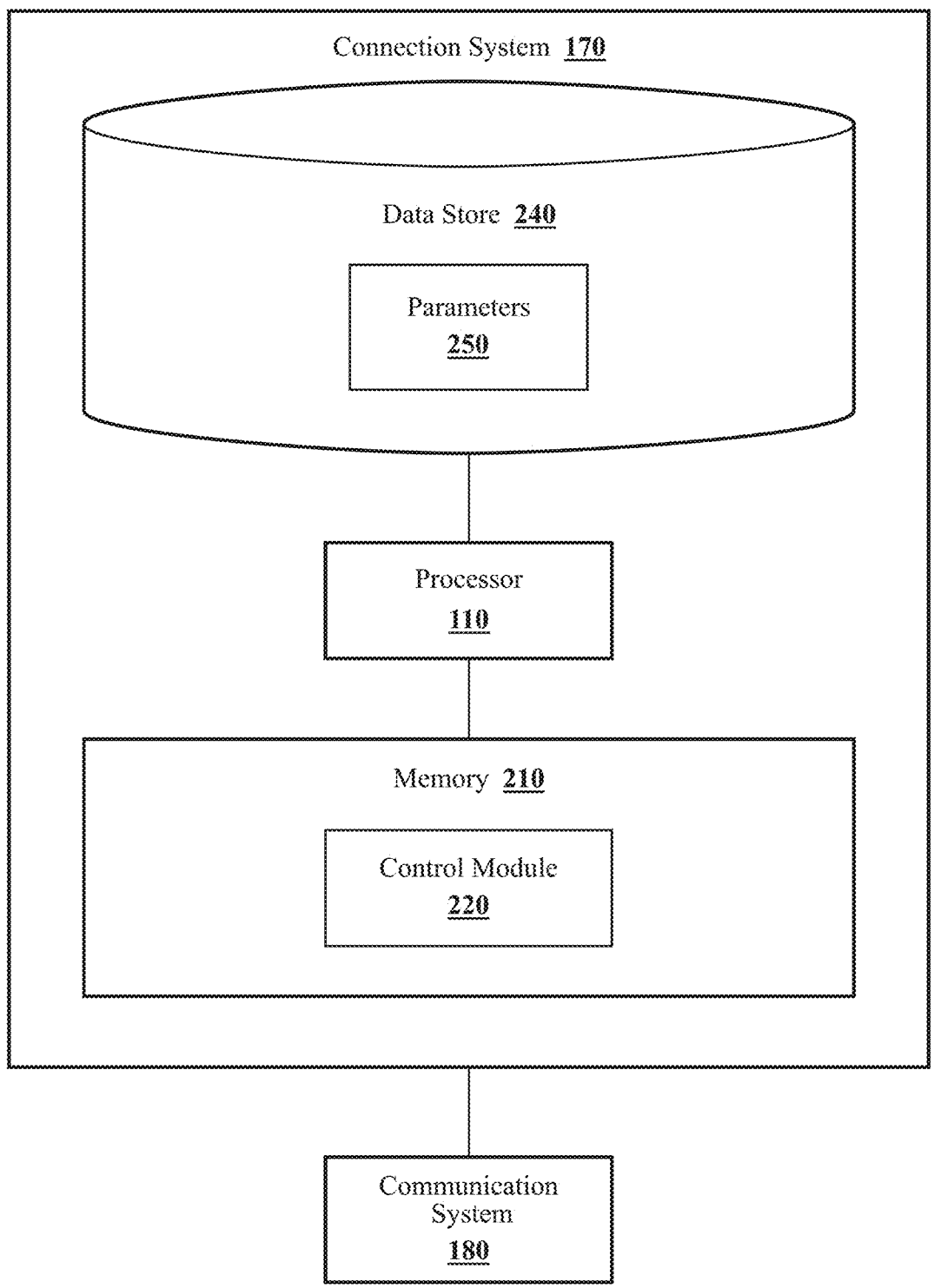
FIG. 2 illustrates one embodiment of a connection system associated with improving latency when establishing P2P connections.

With reference to FIG. 2, one embodiment of the connection system 170 is further illustrated. The connection system 170 is shown as including a processor 110 from the vehicle 100 of FIG. 1. Accordingly, the processor 110 may be a part of the connection system 170, the connection system 170 may include a separate processor from the processor 110 of the vehicle 100 or the connection system 170 may access the processor 110 through a data bus or another communication path. In further aspects, the processor 110 is a cloud-based resource. Thus, the processor 110 may communicate with the connection system 170 through a communication network or may be co-located with the connection system 170. In one embodiment, the connection system 170 includes a memory 210 that stores a control module 220. The memory 210 is a random-access memory (RAM), read-only memory (ROM), a hard-disk drive, a flash memory, or other suitable memory (either volatile or non-volatile) for storing the module 220 and/or other information used by the connection system 170. The module 220 is, for example, computer-readable instructions within the physical memory 210 that, when executed by the processor 110, cause the processor 110 to perform the various functions disclosed herein.

Figure 3:
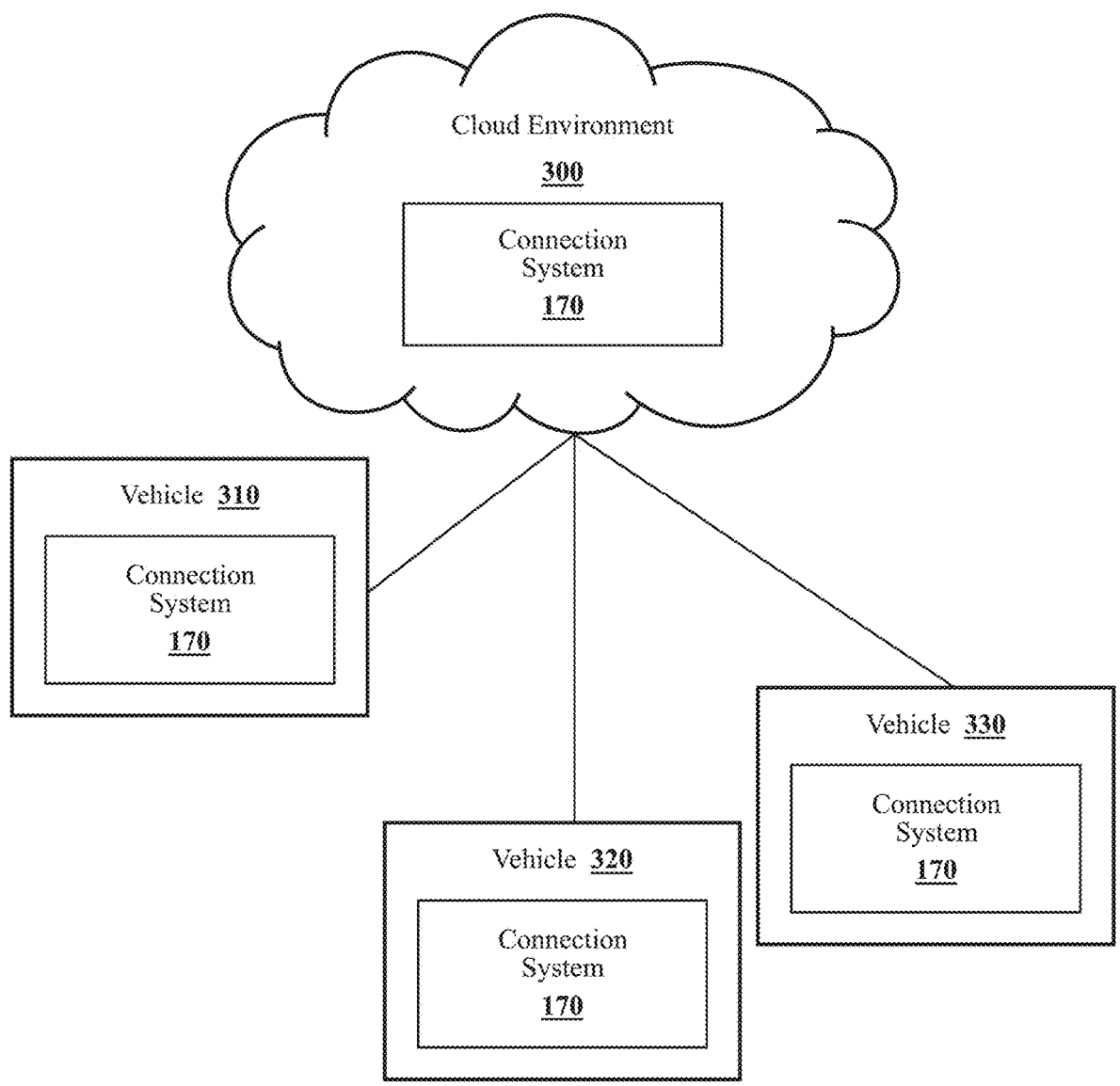
FIG. 3 illustrates a diagram of a connection system within a cloud-computing environment.
Figure 4:
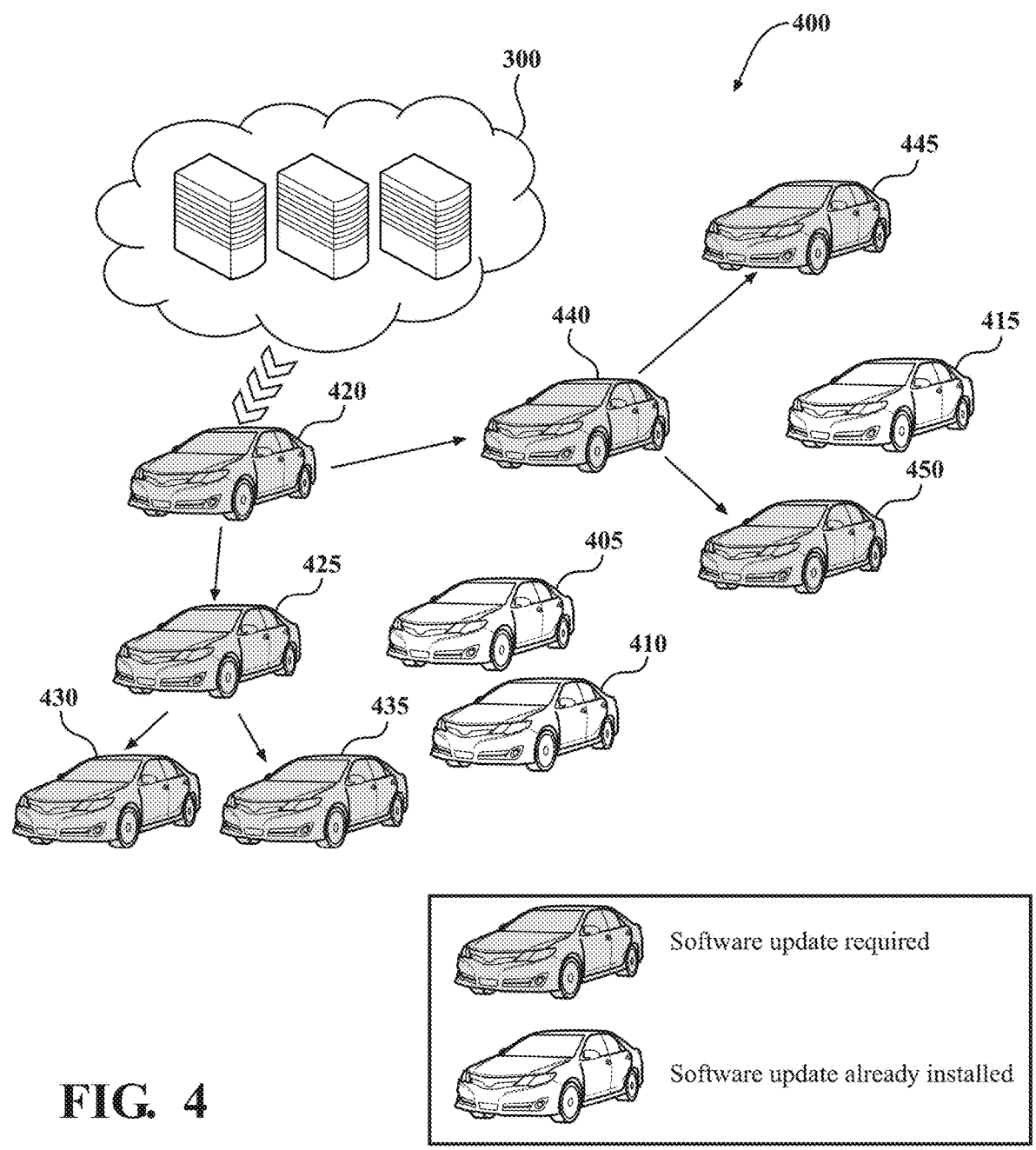
FIG. 4 is a diagram illustrating a distributed environment with vehicles as mobile devices.

As previously noted, the connection system 170 may be further implemented within the vehicle 100 as part of a multi-entity system that can be, for example, a cloud-based system that functions within a cloud environment 300, as illustrated in relation to FIG. 3. That is, for example, the connection system 170 may acquire data (e.g., parameters for establishing a connection) from a remote server that is integrated as part of the cloud environment 300. In one or more approaches, the cloud environment 300 may facilitate the exchange of information between entities (e.g., vehicles 310, 320, and 330) by functioning to provide information that hastens the creation of P2P connections that are micro-clouds of a few entities without reliance on a centralized or cloud-based entity beyond the acquisition of the parameters. As such, the cloud-environment 300 can serve information to the vehicles 310-330 while acting as a third party to the connection between the vehicles 310-330. In this way, the cloud-environment 300 does not provide information between the vehicles 310-330 but instead provides the information that facilitates direct connections between the vehicles 310-330.

Accordingly, as shown, the connection system 170 may include separate instances within one or more entities of the cloud-based environment 300, such as servers, and also instances within vehicles that function separately to acquire parameters from the cloud and establish a connection with other vehicles. In a further aspect, the entities that implement the connection system 170 within the cloud-based environment 300 may vary beyond transportation-related devices and encompass mobile devices (e.g., smartphones), and other such devices that may be carried by an individual within a vehicle and thereby can function in cooperation with the vehicle. Thus, the set of entities that function in coordination with the cloud environment 300 may be varied.

The cloud-based environment 300 itself, as previously noted, is a dynamic environment that comprises cloud members that are routinely migrating into and out of geographic areas and in proximity to other vehicles. In general, the vehicles 310-330 may be stationary or moving, but, in either case, the amount of time that two vehicles remain within proximity of one another such that a range of the communications is effective is considered to be short and thereby benefits from low latency when establishing a connection. Of course, vehicles moving in a same/similar direction or stationary vehicles may also benefit from the low latency connection establishment.

Continuing with FIG. 2 and a general embodiment of the connection system 170, in one or more arrangements, the connection system 170 includes a data store 240. The data store 240 is, in one embodiment, an electronic data structure (e.g., a database) stored in the memory 210 or another electronic memory and that is configured with routines that can be executed by the processor 110 for analyzing stored data, providing stored data, organizing stored data, and so on. Thus, in one embodiment, the data store 240 stores data used by the module 220 in executing various functions. In one embodiment, the data store 240 includes the parameters 250, and/or other information that is used by the module 220. It should be appreciated that while the data store 240 is shown as including the parameters 250 separate instances of the connection system 170 may implement the data store 240 to include different sets of information.

In any case, the control module 220 includes instructions that function to control the processor 110 to acquire the parameters 250. The parameters 250 include, in one or more arrangements, roles, system information, group owner selection, and so on. The system information can include the time period between consecutive discovery windows, the time duration of the discovery windows, the beacon interval, discovery channels, and other information that avoids subsequent negotiations, which may delay the establishment of a connection. In further aspects, the system information further includes a cluster ID for identifying the micro-cloud that may be selected by the remote server or the device with the role of the advertiser selects the cluster-ID.

In general, the remote server, which is a cloud-based resource that is accessed via a cellular communication network, defines the parameters 250. Of course, in further implementations, one of the vehicles that is a party to the connection being established can define one or more of the parameters 250; however, the vehicle then defines the remaining parameters 250 without negotiation with other parties involved in the establishment of the connection in order to avoid degradation of latency. In any case, the remote server functions to generate the parameters 250 according to an optimization algorithm. The remote server may optimize the parameters 250 according to different information that is known to improve latency overall and/or according to specific characteristics of the connection between the vehicles.

For example, an instance of the connection system 170 executing on the remote server may select system information that is known to facilitate faster connection times as opposed to being more robust against interference. The remote server may further adapt the system information according to a known location of the vehicles (e.g., urban, rural, highway, etc.) to better customize the system information. In yet a further aspect, the remote server can identify a degree of congestion (e.g., a number of entities, such as vehicles, that may be communicating wirelessly using similar frequencies) in an area where the connection is to be established. Furthermore, the remote server can also consider attributes of the vehicles, such as a current speed, direction, route, and so on, which may function to indicate an amount of time that the vehicles are within range for communicating. The remote server can use this information to select the parameters 250 specific to the connection, thereby better facilitating establishment of the connection.

The connection system 170 of the remote server can acquire information about the vehicles in various ways to support generating the parameters 250. In general, the connection system 170 maintains separate connections with the vehicles via a cellular network. Thus, the cellular network functions to convey contextual data about the vehicles and associated environments/locations to the remote server, so that information for assisting in connection establishment is available. Of course, in further approaches, the connection system 170 of the remote server may generate the parameters 250 without the information but still provides the parameters 250 via the cellular network.

The initiation of the connection between two or more vehicles can occur in different ways. As one example, consider FIG. 4, which illustrates a distributed environment 400 with vehicles as mobile devices. In particular, the distributed environment shows a remote server within the cloud environment 300. Various vehicles are also shown, with some of the vehicles including a software update and others having yet to acquire the software update. In general, the software update is illustrative of a one-way heavy data transfer from the remote server or one of the vehicles to the vehicles in need of the software update. As one example, such an update may be on the order of a few Megabytes to tens of Gigabytes or more. Thus, when considering the plurality of vehicles to which the update is to be provided, acquiring the update by all of the vehicles from the server is not practical due to bandwidth restrictions. As such, the distributed environment 300 instead can rely on peer-to-peer (P2P) connections between vehicles with the software update and those that desire to acquire the update. This type of direct connection is efficient and generally cost-free in that no specific service provider charges for the consumed bandwidth of this type of connection.

Accordingly, vehicles 405, 410, 415, and 420 represent vehicles that have already received the software update, whereas vehicles 425, 430, 435, 440, 445, and 450 represent vehicles that still require the software update. One or more of the vehicles 425, 430, 435, 440, 445, and 450 may acquire the update from the remote server or another vehicle. In any case, the vehicles with the update may function to transfer the software update to the other vehicles that still require the update by using P2P connections. Thus, the distribution of the software update may function as an initiating event between proximate vehicles, thereby inducing the remote server to generate and provide the parameters 250 to the respective vehicles separately. It should be appreciated that while the present example discusses a software update, other events may also induce initiation of establishing the connection, such as data updates for maps, proximity of vehicles for sharing information, and so on. In yet further aspects, one of the vehicles may request to initiate connections. For example, a vehicle that includes the software update may volunteer to distribute the software update and request the remote server to initiate connections for proximate vehicles.

In any case, once the remote server generates the parameters and provides the parameters to, for example, vehicle 420, which also includes the software update, then the control module 220 functions to perform device and service discovery simultaneously. In one approach, the control module 220 uses the parameters 250 to configure transmissions. As noted, the parameters 250 can define timing intervals for how frequently communications are transmitted, a channel on which communications are transmitted, and so on. As a further aspect, the control module 220 determines a role of the vehicle 420 as defined by the parameters 250 and which device is the group owner. In the instant case, because the vehicle 420 is providing the service, the vehicle 420 is the advertiser and also the group owner. Thus, the control module 220 proceeds by generating a beacon message for transmission that advertises the presence of the vehicle and also the availability of the software update service by the vehicle 420. The control module 220, in one approach, achieves this combined/simultaneous process by using beacon stuffing. That is, the control module 220 embeds information about the provided service (e.g., the software update) with the beacon message, which is typically transmitted for purposes of device discovery alone. In this way, the control module 220 avoids a need for additional messages after the device discovery process.

From the perspective of the listening device, consider vehicle 425. Similar to the sequence of events noted in relation to the vehicle 420, the control module 220 embedded in the vehicle 425 initially receives the parameters 250 from the remote server defining characteristics of the connection that is to be established. However, because the vehicle 425 is not providing the service but is instead seeking the service associated with acquiring the software update, the control module 220 configures the vehicle 425 according to the parameters 250 to listen for a device advertising the service as defined by the parameters 250. This may include listening on a defined channel at particular intervals. Upon receiving the beacon message, the control module 220 of the vehicle 425 identifies the device and the service and then generates a probe response to the beacon message that functions to initiate the connection with the vehicle 420.

To establish the connection, the vehicle 420 and the vehicle 425 may further perform an authentication exchange that includes, in one or more embodiments, a four-way handshake as may be defined according to IEEE 802.11 or another suitable authentication exchange according to various protocols (e.g., IEEE 802.1AE, etc.). The authentication exchange, in general, provides for establishing a secure connection between the devices through the use of cryptographic keys. As such, once authenticated, the vehicles 420 and 425 may proceed with exchanging data as part of the service (e.g., software update).

Figure 5:
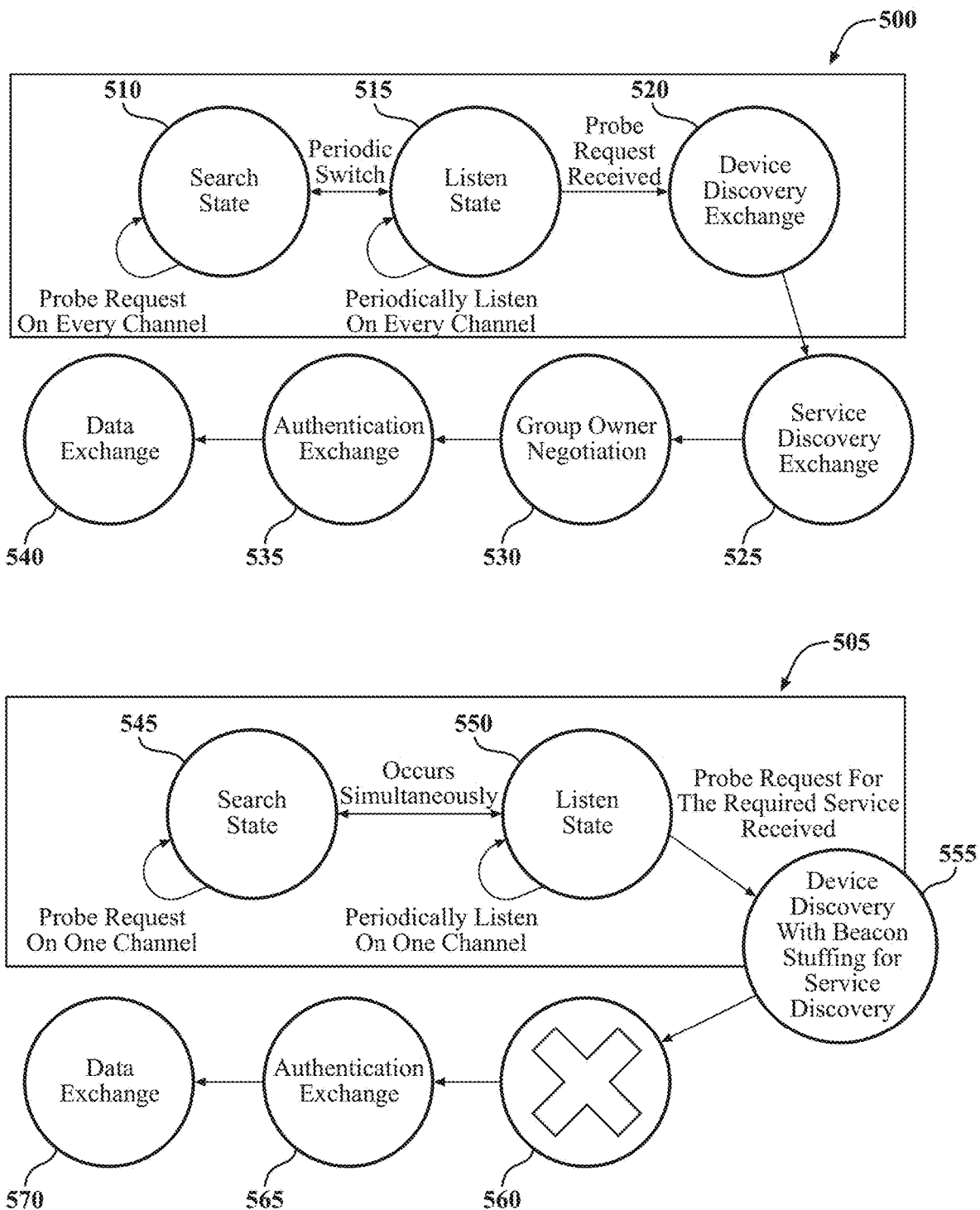
FIG. 5 illustrates separate state diagrams for different approaches to establishing a connection.

As a further explanation of how the connection system 170 streamlines establishing a connection between mobile devices, consider FIG. 5. FIG. 5 illustrates separate state diagrams for different approaches to establishing a connection. In particular, FIG. 5 provides a comparison of a first approach 500 and a second approach 505. In general, the second approach 505 aligns with how the connection system 170 efficiently establishes a connection, whereas the approach 500 includes various additional steps that may lead to added latency as may be implemented with WiFi P2P specifications.

For example, the first approach 500 is shown as including states 510, 515, 520, 525, 530, 535, and 540. The separate states generally represent different actions or exchanges of messages on the part of the vehicles. As shown in the approach 500, the search state 510 and the listen state 515 involve transmitting probe requests on multiple different channels, and thus also listening for the probe request on the channels depending on the role of the device, which also alternates periodically. By contrast, the search state 545 and the listen state 550 occur via a single channel defined by the parameters 250 and do not alternate between devices as the roles are also defined by the parameters 250.

Further, the approach 500 shows a device discovery exchange 520 and a service discovery exchange 525. Thus, in the approach 500, device discovery and service discovery occur separately according to different exchanges of messages that each contribute to the latency of establishing the connection. By contrast, the approach 505 includes a single device discovery and service discovery state 555 that occurs according to the probe request/beacon message and without additional exchanges of messages between the parties. Continuing with FIG. 5, the approach 500 further includes an explicit group owner negotiation 530, whereas the approach 505 removes this negotiation, which is shown as the removal of block 560. Thus, the approach 505 further improves latency by providing for the assignment of the group owner as part of the parameters 250. Further aspects of the approaches 500 and 505 are generally similar with authentication exchanges 535/565, which establish the connection and then use of the connection to perform data exchange, as shown by 540 and 570.

Figure 6:
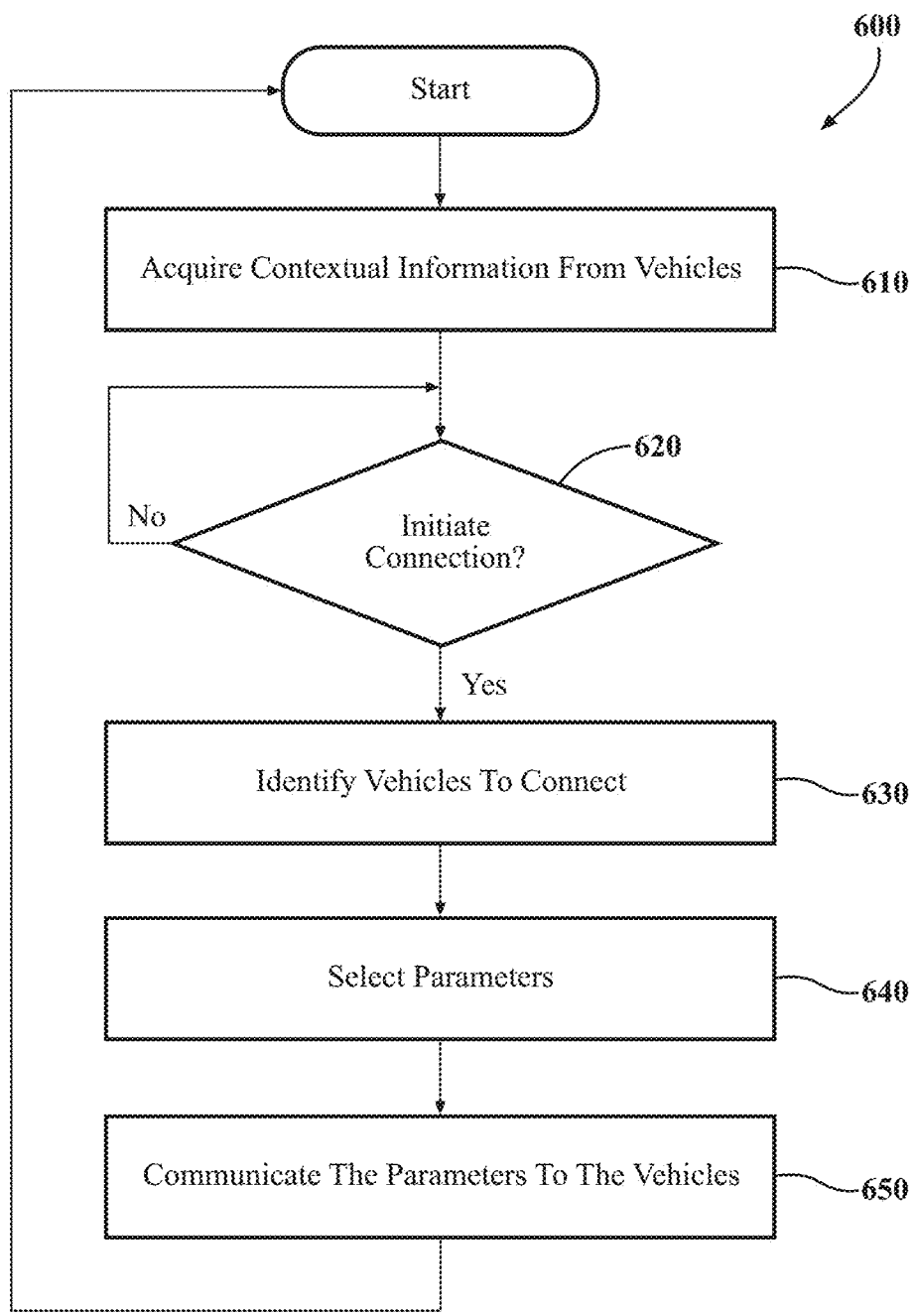
FIG. 6 is a flowchart illustrating one embodiment of a method associated with defining parameters and assisting mobile devices in establishing a connection.

Additional aspects about improving the latency of establishing connections will be described in relation to FIGS. 6-7. FIG. 6 illustrates a flowchart of a method 600 that is associated with defining parameters and assisting mobile devices in establishing a connection. Method 600 will be discussed from the perspective of the connection system 170 of FIGS. 1-2 as implemented by a remote server of the cloud-based environment 300 that communicates with vehicles (e.g., vehicles 310-330). While method 600 is discussed in combination with the connection system 170, it should be appreciated that the method 600 is not limited to being implemented within the connection system 170 but is instead one example of a system that may implement the method 600. Furthermore, while the method is illustrated as a generally serial process, various aspects of the method 600 can execute in parallel to perform the noted functions.

At 610, the control module 220 of the remote server acquires contextual information about vehicles or other mobile devices for which the remote server facilitates connections. In one arrangement, the control module 220 receives communications from the vehicles specifying aspects, such as a current location, a current status (e.g., upgraded, not upgraded, etc.), a current route, and/or other information that is useful to the remote server in determining whether a connection is to be established. In yet a further arrangement, the remote server may provide an explicit request to the remote server in requesting a connection, which may serve as the contextual information at 610.

At 620, the control module 220 determines that a connection is to be established according to, for example, the contextual information. As described previously, the control module 220 may identify a proximity of mobile devices as an initiating aspect for a connection (e.g., within a defined distance of 100 m or less), an explicit request from a vehicle that is to distribute an update, an explicit request from a vehicle that desires to acquire an update, or according to another defined aspect, such as a vehicle entering a geographic region, and so on.

At 630, the control module 220 identifies the vehicle to connect. In one arrangement, the control module 220 determines which vehicles are within the defined distance. In a further arrangement, the control module 220 determines which vehicles have the data to provide and which vehicles require the data. In any case, it should be appreciated that the remote server can dynamically pair the vehicles to establish a connection. Moreover, the remote server, in one approach, may group more than two devices together to form multiple connections with a single advertiser.

At 640, the control module 220 selects the parameters 250. In one configuration, the control module 220 defines multiple aspects, such as i) roles for entities using the connection, and ii) characteristics of the connection itself. The roles include the advertiser, which is the device that will provide the service and will transmit the beacon message, and the listener, which is the device seeking the service that will wait and listen for the beacon message from the advertiser according to the parameters 250. As noted previously, the characteristics defined within the parameters 250 include a time between discovery windows, a window duration for the discovery windows, a beacon interval, and a discovery channel (i.e., frequency of a channel on which the devices will provide probe requests/responses). In a further aspect, the parameters 250 also indicate an exact time and frequency on which the devices will provide probe requests and responses. Accordingly, the parameters 250 automate aspects of establishing the connection, such as role selection, group owner selection, and selection of system information, thereby improving the latency of establishing the connection.

At 650, the control module 220 provides the parameters 250 to the vehicles to control establishing the connection. As specified, the remote server communicates with the vehicles over a cellular network. Thus, the remote server can maintain an open channel for providing information, such as the parameters 250 to the vehicles, and can then facilitate the vehicles with establishing P2P connections.

Figure 7:
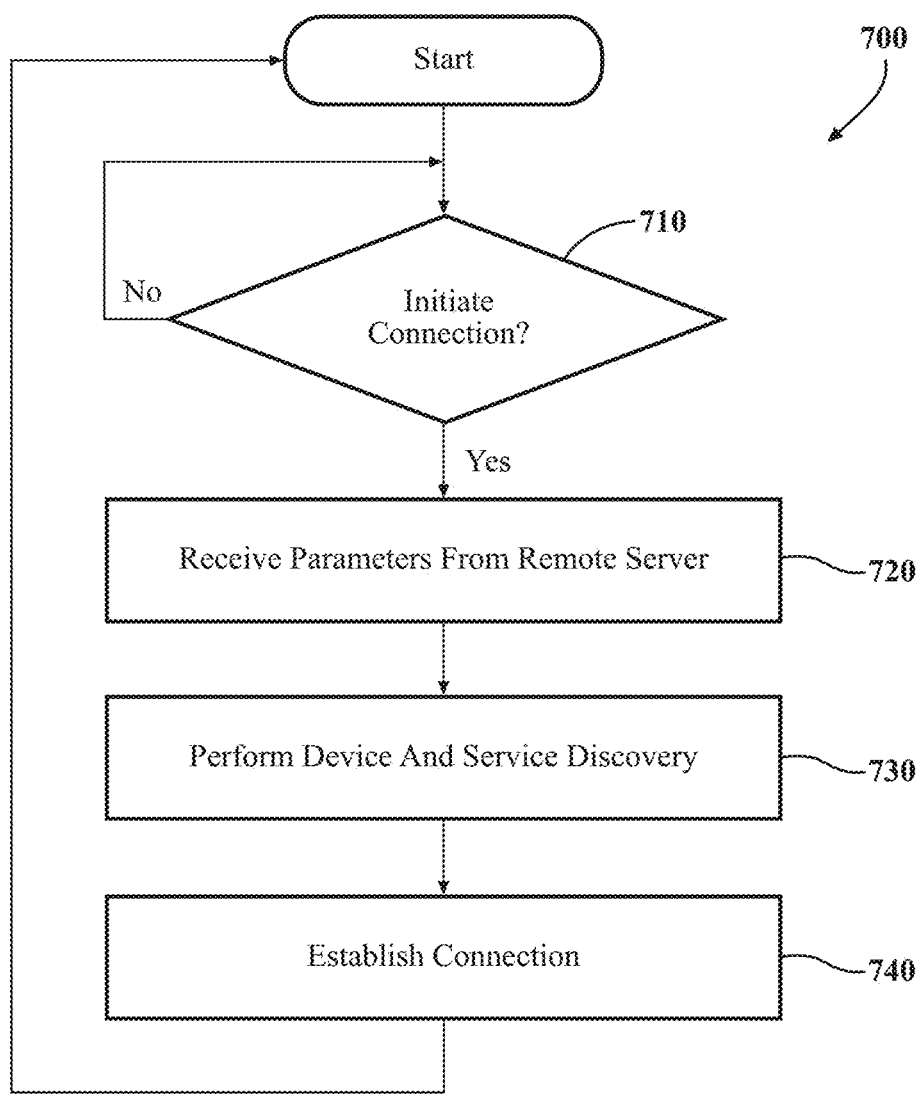
FIG. 7 is a flowchart illustrating one embodiment of a method associated with establishing a connection between mobile devices using parameters from a remote server.

FIG. 7 illustrates a flowchart of a method 700 that is associated with establishing a connection between mobile devices using parameters from a remote server. Method 700 will be discussed from the perspective of the connection system 170 of FIGS. 1-2 as implemented by an entity, such as a vehicle, that may be in communication within the cloud-based environment 300. While method 700 is discussed in combination with the connection system 170, it should be appreciated that the method 700 is not limited to being implemented within the connection system 170 but is instead one example of a system that may implement the method 700. Furthermore, while the method is illustrated as a generally serial process, various aspects of the method 700 can execute in parallel to perform the noted functions.

At 710, the control module 220 determines whether a connection is to be established with at least one remote vehicle by the vehicle 100 (i.e., the subject vehicle). As indicated previously, the control module 220 may decide to initiate a connection according to several different occurrences, such as a request from the remote server to distribute data, a need to acquire an update, and so on. Thus, when such an event occurs, the control module 220 may generate a request to the remote server and/or wait to receive the parameters 250.

At 720, the control module 220 receives the parameters 250 from the remote server. In general, the control module 220 acquires the parameters 250 via a cellular network that functions as an additional connection with the remote server as a way of conveying information for facilitating the creation of the connection. As noted previously, the parameters 250 include aspects relating to roles of the devices and characteristics of the connection itself, such as a channel for communicating and aspects about timing.

At 730, the control module 220 performs device discovery and service discovery simultaneously. Depending on the role of the device, the specific function performed at 730 may vary. For example, the advertiser embeds information about available services within a communication for device discovery, i.e., a beacon message. In general, this is referred to as beacon stuffing. Thus, the control module 220 modifies the beacon message by using extra bytes within the beacon message to encode information about the service provided by the vehicle 100. This process of modifying the beacon message may include embedding various codes indicating the service, the available information (e.g., version numbers), and so on within the beacon message at locations that are otherwise unused (e.g., empty fields) or are padding for the message. In this way, the beacon message can serve a dual purpose of providing for device discovery (i.e., identification of the device sending the message) while also providing for service discovery (i.e., identification of aspects relating to the service, such as which service is provided by the device, information about the data that is available, and so on).

From the perspective of the listening device, at 730, the control module 220 acts to listen for, identify, and acquire the beacon message. Once the listening device has the beacon message, the control module parses the beacon message for relevant information and decodes the information to discern the identity of the advertiser and what service is provided. If the service aligns with a need of the listening device, then the control module 220 generates and transmits a probe response as a reply to the beacon message. The response functions to initiate additional actions in furtherance of establishing the connection.

At 740, the control module 220 establishes the connection between the vehicles. For example, the control module 220 may perform various additional actions, such as an authentication exchange between the vehicles that provide for securing communications provided on the connection. Once the connection is established, the vehicles communicate using the connection to transfer data, such as the software update, a map update, or whatever data is provided via the service of the advertiser.

Figure 8:
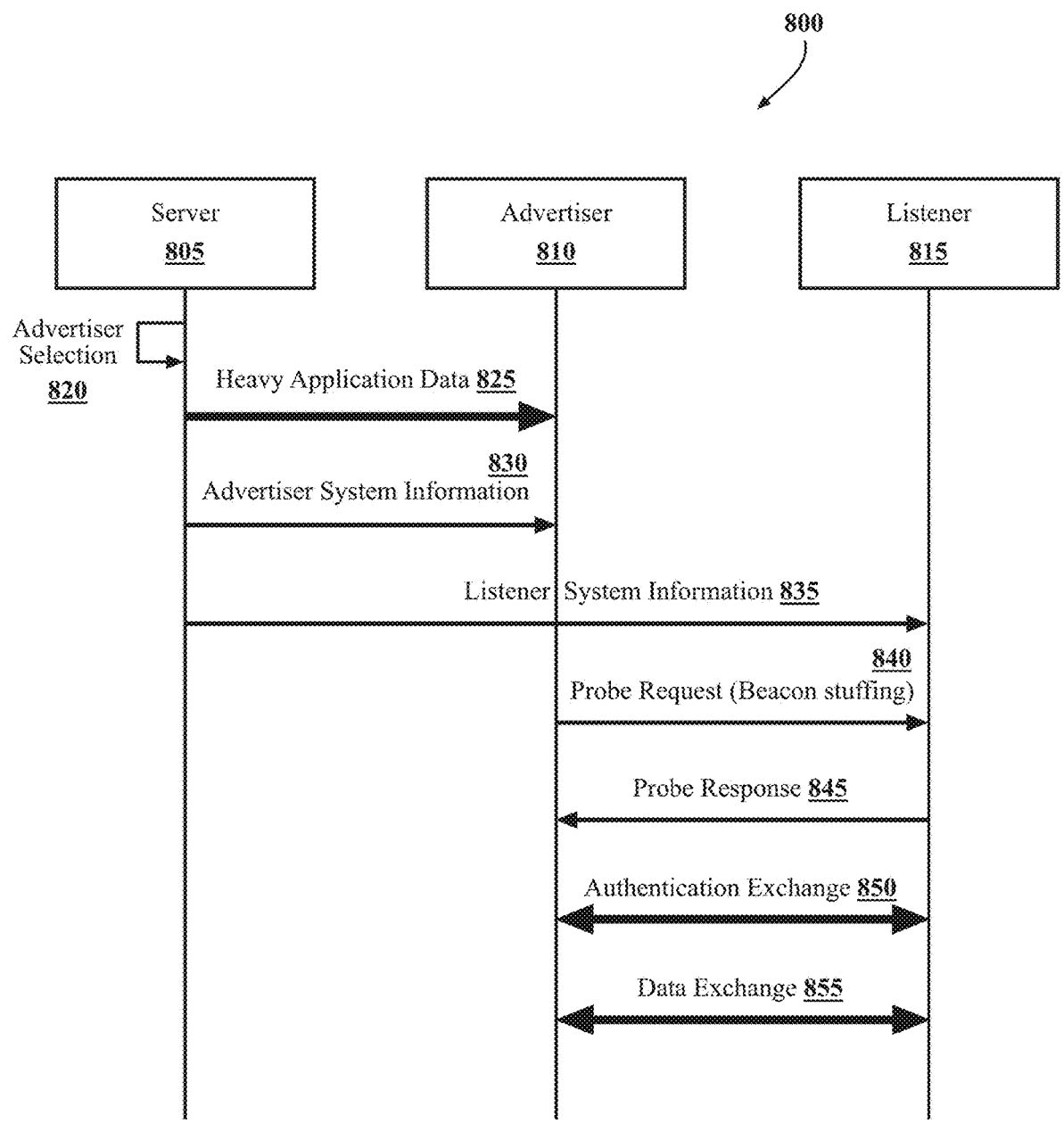
FIG. 8 illustrates a diagram of the timing for messages between different entities when establishing a connection.

As a further explanation of the connection system 170, reference will now be made to FIG. 8. FIG. 8 illustrates a diagram 800 of the timing for messages between different entities when establishing a connection. In particular, the diagram 800 is a timing diagram that shows interactions between a server 805 (e.g., the remote server), an advertiser 810 (e.g., the subject vehicle), and a listener 815 (e.g., the remote vehicle). Initially, the server 805, upon determining to initiate a connection between two mobile devices, selects the roles at 820 of advertiser and listener for the mobile devices. As shown in the diagram 800, the server 805 then transfers heavy application data 825 to the advertiser. The heavy application data is a software update, HD map data, or other information. It should be appreciated that, in various arrangements, the advertiser 810 may already possess data or capabilities associated with a service and thus may not receive a transfer from the remote server 805 as part of establishing a connection.

Continuing with the diagram 800, the server 805 then provides the system information at 830 to the advertiser 810 and at 835 to the listener 815. The system information includes the parameters 250 that define characteristics of the connection that is to be formed and aspects relating to how the connection is to be established. It should be further appreciated that the communications 825, 830, and 835 occur over a cellular network, whereas communications 840-855 occur over a wifi. A probe request 840 with beacon stuffing is broadcast from the advertiser 810 onto a channel and otherwise according to the parameters 250. The listener 815 then receives the probe request 840 and identifies the service and the device (i.e., the advertiser) from the probe request 840. In response, the listener transmits a probe response 845, indicating a desire to establish the connection for the service. Thereafter, the advertiser 810 and the listener 815 perform the authentication exchange 850 to secure the connection, which is then established. Accordingly, the advertiser 810 and the listener 815 may then perform the data exchange 855 using the connection.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Of course, in further aspects, the vehicle 100 may be a manually driven vehicle that may or may not include one or more driving assistance systems, such as active cruise control, lane-keeping assistance, crash avoidance, and so on. In any case, "manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include various types of sensors. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element, or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the connection system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement, speed, maneuvering, heading, direction, etc. of the vehicle 100. The processor(s) 110, and/or the automated driving module(s) 160 may control some or all of these vehicle systems 140 and, thus, may be partially or fully autonomous.

The processor(s) 110, and/or the automated driving module(s) 160 can be operatively connected to communicate with the various vehicle systems 140 and/or individual components thereof. For example, returning to FIG. 1, the processor(s) 110, the connection system 170, and/or the automated driving module(s) 160 can be in communication to send and/or receive information from the various vehicle systems 140 to control the movement, speed, maneuvering, heading, direction, etc. of the vehicle 100. The processor(s) 110, the connection system 170, and/or the automated driving module(s) 160 may control some or all of these vehicle systems 140.

The processor(s) 110, and/or the automated driving module(s) 160 may be operable to control the navigation and/or maneuvering of the vehicle 100 by controlling one or more of the vehicle systems 140 and/or components thereof. For instance, when operating in an autonomous mode, the processor(s) 110, and/or the automated driving module(s) 160 can control the direction and/or speed of the vehicle 100. The processor(s) 110, and/or the automated driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the automated driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine the position and velocity of the vehicle 100. The automated driving module(s) 160 can determine the location of obstacles, obstacles, or other environmental features, including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the connection system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A connection system for improving connection latency, comprising:
    one or more processors; and
    a memory communicably coupled to the one or more processors and storing:
    a control module including instructions, that when executed by the one or more processors, cause the one or more processors to:
    responsive to determining that a connection is to be established with at least one remote vehicle by a subject vehicle, acquire parameters, from a remote server, that define characteristics of the connection;
    perform device discovery and service discovery simultaneously by embedding information about available services within a communication for device discovery; and
    establish the connection between the subject vehicle and the at least one remote vehicle according to the parameters.

2. The connection system of claim 1, wherein the control module includes instructions to perform device discovery and service discovery including instructions to modify the communication by an advertiser that is the subject vehicle to embed the information using extra bytes within the communication, and wherein the communication is a beacon message.

3. The connection system of claim 1, wherein the control module includes instructions to acquire the parameters including instructions to cause the remote server to define i) roles for entities using the connection, and ii) characteristics of the connection.

4. The connection system of claim 3, wherein the roles include advertiser and listener,
    wherein the characteristics include a time between discovery windows, a window duration for the discovery windows, a beacon interval, and a discovery channel, and
    wherein the remote server provides the characteristics to the subject vehicle and the at least one remote vehicle to control establishing the connection via a cellular network.

5. The connection system of claim 1, wherein the control module includes instructions to determine that the connection is to be established including instructions to determine at least one of i) whether the subject vehicle is storing a software update that is to be provided to the at least one remote vehicle, and ii) whether the subject vehicle and the at least one remote vehicle are within a defined distance.

6. The connection system of claim 1, wherein the control module includes instructions to establish the connection including instructions to authenticate the at least one remote vehicle from the subject vehicle responsive to a probe request, and wherein the control module includes instructions to acquire the parameters automate role selection, group owner selection, and selection of system information by using the parameters in place of negotiating with the at least one remote vehicle to improve latency of establishing the connection.

7. The connection system of claim 1, wherein the control module includes instructions to: communicate from the subject vehicle to the remote vehicle using the connection to transfer data including a software update or a map update for the at least one remote vehicle.

8. The connection system of claim 1, wherein the connection is a peer-to-peer connection.

9. A non-transitory computer-readable medium storing instructions for improving connection latency and that, when executed by one or more processors, cause the one or more processors to:
responsive to determining that a connection is to be established with at least one remote vehicle by a subject vehicle, acquire parameters, from a remote server, that define characteristics of the connection;
perform device discovery and service discovery simultaneously by embedding information about available services within a communication for device discovery; and
establish the connection between the subject vehicle and the at least one remote vehicle according to the parameters.

10. The non-transitory computer-readable medium of claim 9, wherein the instructions to perform device discovery and service discovery include instructions to modify the communication by an advertiser that is the subject vehicle to embed the information using extra bytes within the communication, and wherein the communication is a beacon message.

11. The non-transitory computer-readable medium of claim 9, wherein the instructions to acquire the parameters include instructions to cause the remote server to define i) roles for entities using the connection, and ii) characteristics of the connection.

12. The non-transitory computer-readable medium of claim 11, wherein the roles include advertiser and listener,
wherein the characteristics include a time between discovery windows, a window duration for the discovery windows, a beacon interval, and a discovery channel, and
wherein the remote server provides the characteristics to the subject vehicle and the at least one remote vehicle to control establishing the connection via a cellular network.

13. The non-transitory computer-readable medium of claim 9, wherein the instructions to determine that the connection is to be established including instructions to determine at least one of i) whether the subject vehicle is storing a software update that is to be provided to the at least one remote vehicle, and ii) whether the subject vehicle and the at least one remote vehicle are within a defined distance.

14. A method, comprising:
responsive to determining that a connection is to be established with at least one remote vehicle by a subject vehicle, acquiring parameters, from a remote server, that define characteristics of the connection;
performing device discovery and service discovery simultaneously by embedding information about available services within a communication for device discovery; and
establishing the connection between the subject vehicle and the at least one remote vehicle according to the parameters.

15. The method of claim 14, wherein performing device and service discovery simultaneously includes modifying a beacon message that is the communication by an advertiser that is the subject vehicle to embed the information using extra bytes within the beacon messages.

16. The method of claim 14, wherein acquiring the parameters includes the remote server defining i) roles for entities using the connection, and ii) characteristics of the connection.

17. The method of claim 16, wherein the roles include advertiser and listener,
wherein the characteristics include a time between discovery windows, a window duration for the discovery windows, a beacon interval, and a discovery channel, and
wherein the remote server provides the characteristics to the subject vehicle and the at least one remote vehicle to control establishing the connection via a cellular network.

18. The method of claim 14, wherein determining that the connection is to be established includes at least one of i) the subject vehicle storing a software update that is to be provided to the at least one remote vehicle, and ii) determining that the subject vehicle and the at least one remote vehicle are within a defined distance.

19. The method of claim 14, wherein establishing the connection includes authenticating the at least one remote vehicle from the subject vehicle responsive to a probe request, and
wherein the parameters automate role selection, group owner selection, and selection of system information to improve latency of establishing the connection.

20. The method of claim 14, further comprising:
communicating from the subject vehicle to the remote vehicle using the connection to transfer data including a software update or a map update for the at least one remote vehicle,
wherein the connection is a peer-to-peer connection.

* * * * *